United States Patent

[11] 3,630,301

| [72] | Inventor | Jon M. Henricks<br>Route 22, Long Grove, Ill. 60047 |
| --- | --- | --- |
| [21] | Appl. No. | 8,621 |
| [22] | Filed | Feb. 4, 1970 |
| [45] | Patented | Dec. 28, 1971 |

[54] CONVERTIBLE SNOW MOTORCYCLE
8 Claims, 8 Drawing Figs.

[52] U.S. Cl. .................................................. 180/6 A,
280/7.14, 280/DIG. 5
[51] Int. Cl. ...................................................... B62m 29/00,
B62k 13/00
[50] Field of Search ........................................... 180/6, 6 A,
5 R; 280/7.14, 7.12, 12.14, 9

[56] References Cited
UNITED STATES PATENTS
561,405 6/1896 Leahan ........................ 280/7.14

| 650,171 | 5/1900 | Dannehl ...................... | 280/7.14 |
| --- | --- | --- | --- |
| 800,186 | 9/1905 | Vaughan ...................... | 280/7.14 |
| 3,252,533 | 5/1966 | Aeder et al. .................. | 180/5 R |
| 1,158,584 | 11/1915 | Thomas ........................ | 280/9 |

FOREIGN PATENTS

| 175,047 | 9/1906 | Germany ...................... | 180/6 A |
| --- | --- | --- | --- |
| 141,208 | 3/1935 | Austria ........................ | 180/6 R |
| 866,523 | 5/1941 | France ......................... | 180/6 A |

*Primary Examiner*—Leo Friaglia
*Attorney*—Ira Milton Jones

ABSTRACT: A riding-type vehicle supported at its front by a steerable ski and at its rear selectively be either a second ski or a pair of power-driven wheels with large balloon tires, as determined by the rider.

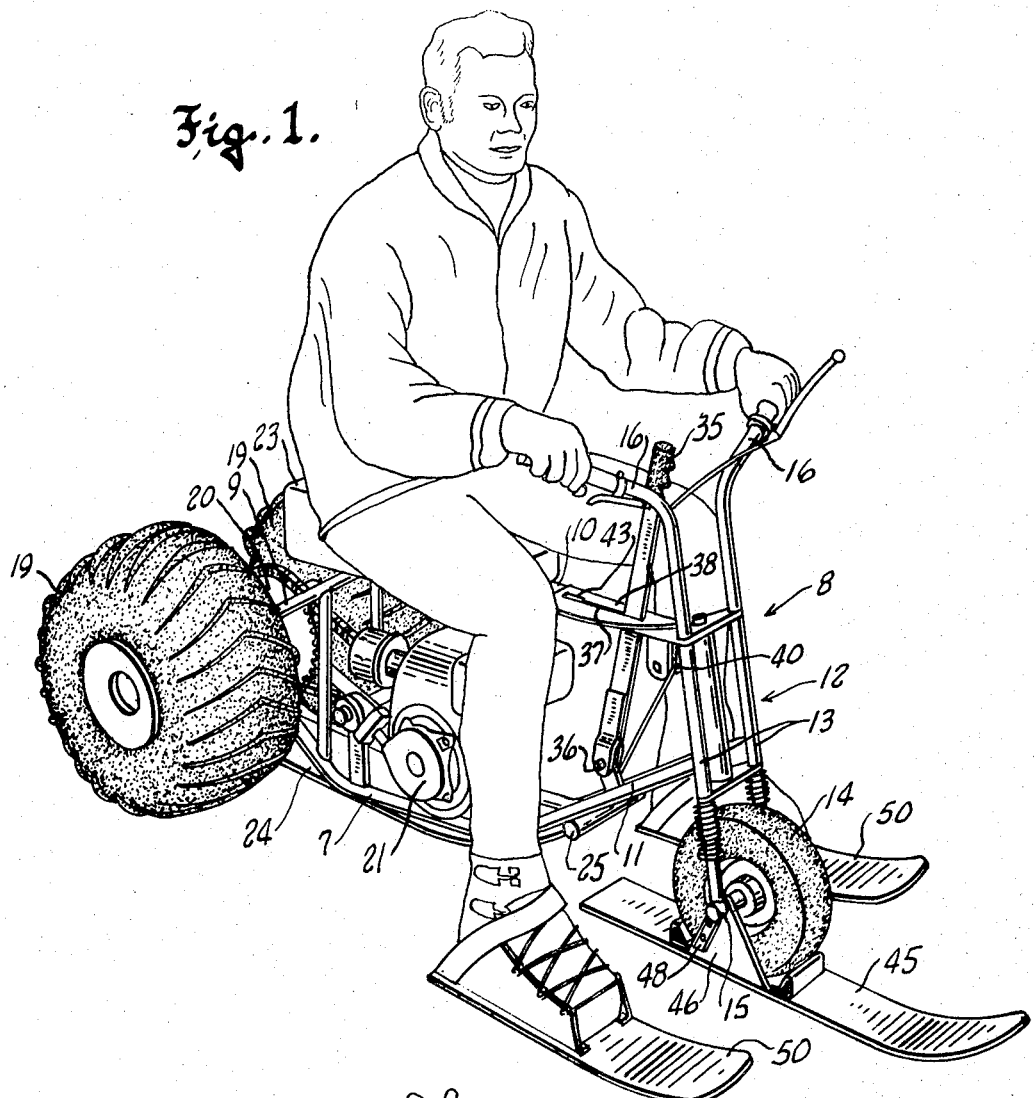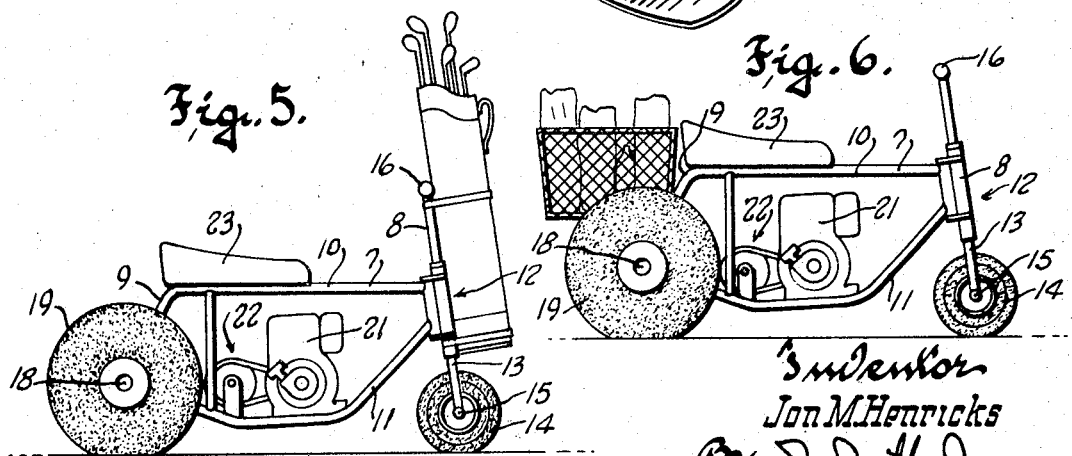

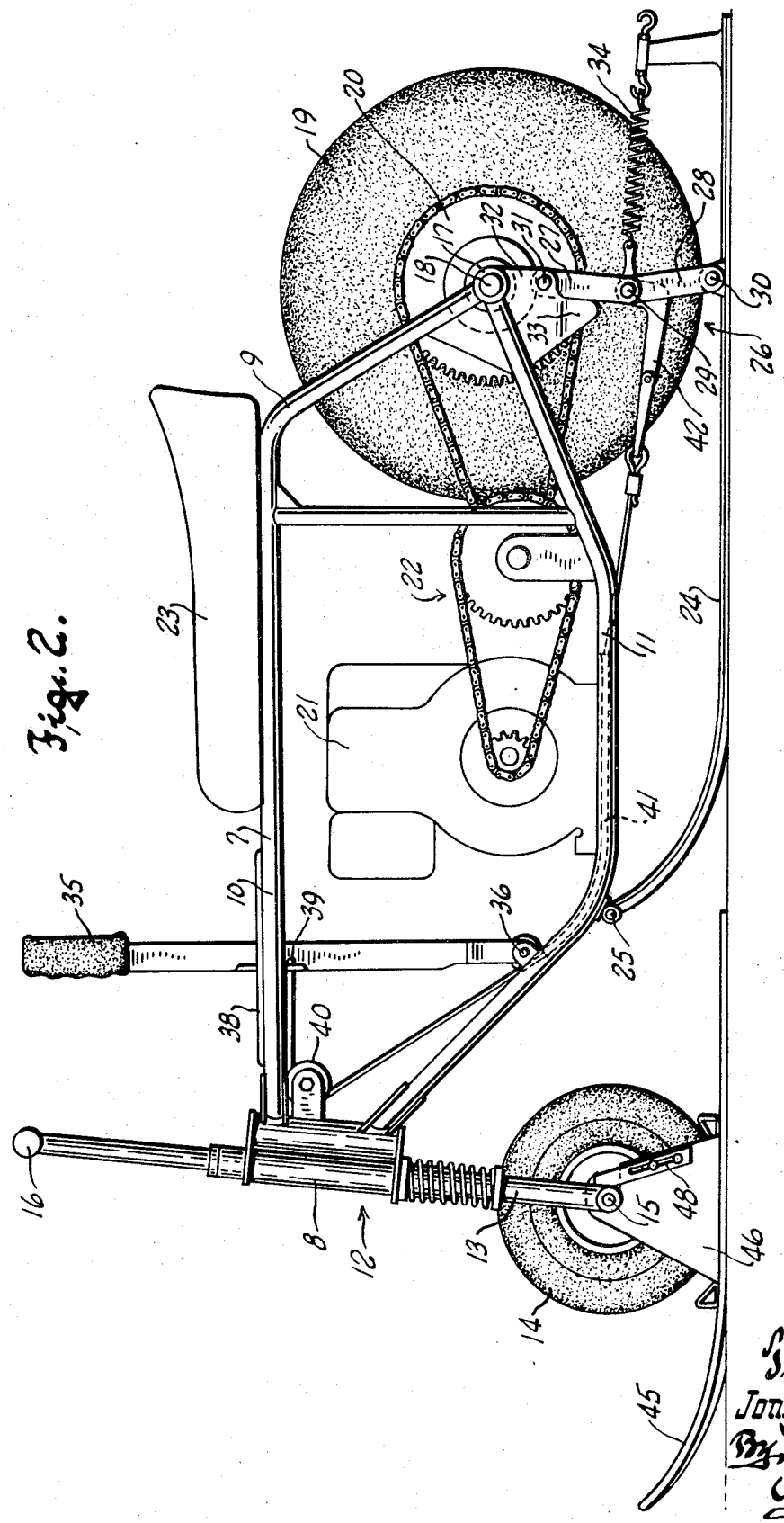

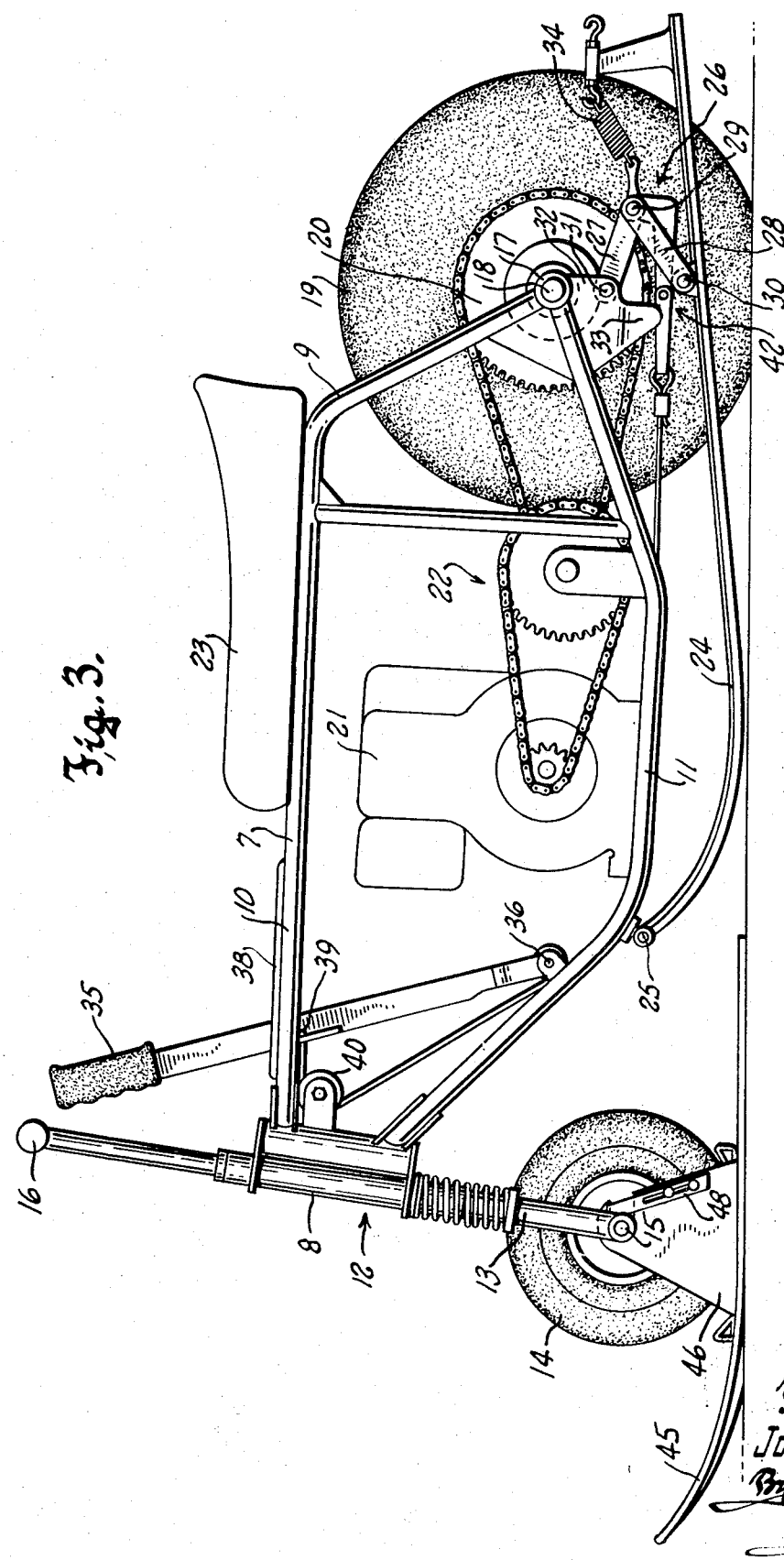

PATENTED DEC 28 1971

Inventor
Jon M. Henricks

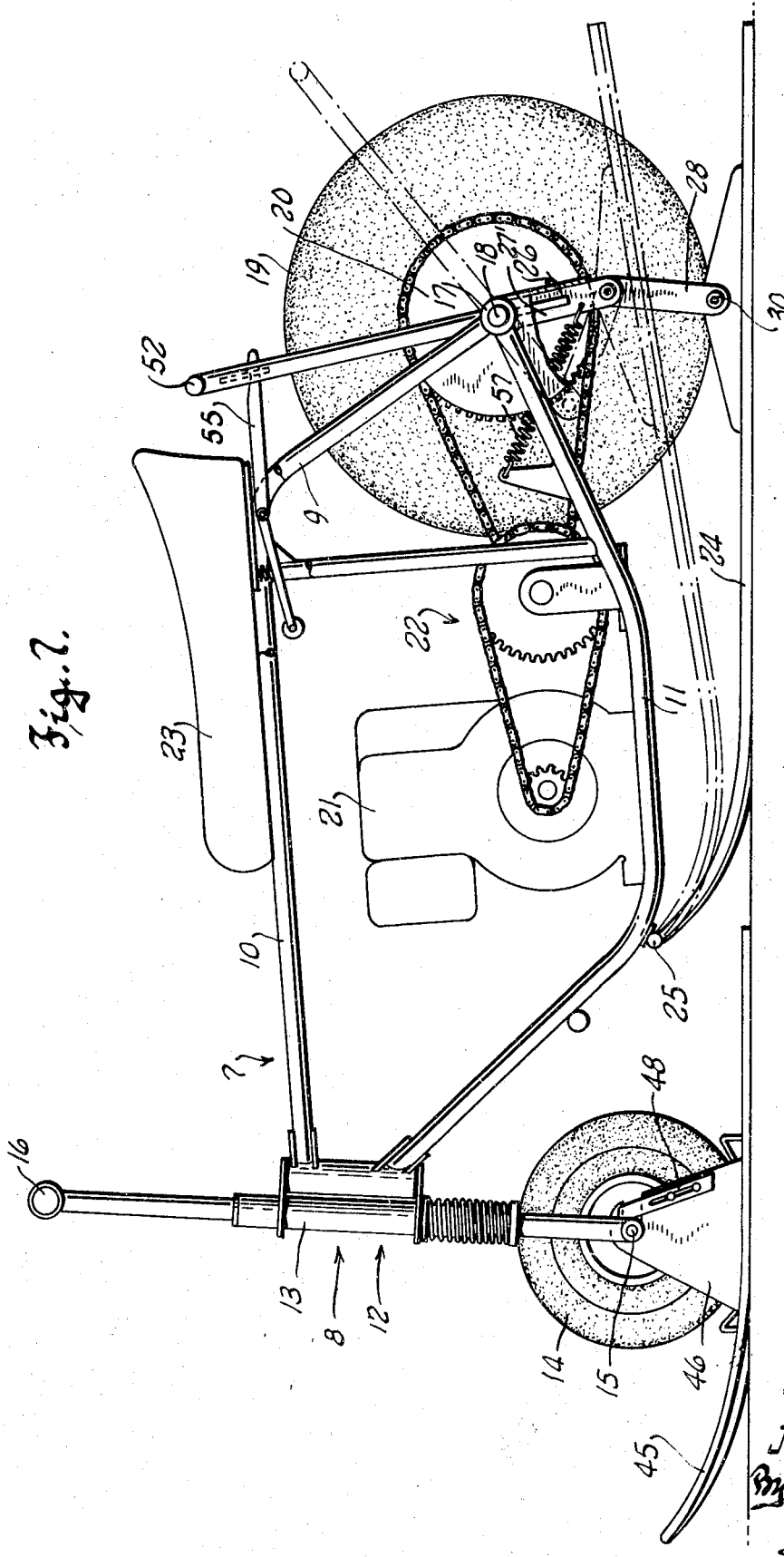

CONVERTIBLE SNOW MOTORCYCLE

This invention relates to riding-type vehicles, especially adapted for winter sports, but convertible to other uses.

The purpose and object of the invention is to provide an improved ski-supported vehicle which is equipped with power-driven traction wheels that can be rendered operative to drive the vehicle uphill and can be deactivated so as not to interfere with sliding downhill.

The concept of a power-driven vehicle for use on snow and ice is of course not new. Its inception perhaps grew out of experiences of early motorists in their efforts to cope with winter driving. By 1923, when Herman E. Pearson of Wayzata, Minn., filed his application for U.S. Pat. No. 1,637,533, the idea was already well established, as is evident from the fact that he presented his invention as an improved means for driving a vehicle equipped with runners in place of the usual wheels.

From his conversion of the touring car of that era to a power-driven sleigh, Pearson moved to what might be considered the forerunner of the present day "Sno-Mobile," for in 1924 he filed applications for U.S. Pat. Nos. 1,682,051 and 1,686,846—the first for a Motor Toboggan and the second for Power Driven Skis. What success the patentee Pearson had with his power-driven toboggan and skis, of course, is not known, but in each case steering must have been a most serious problem, for the steering means disclosed in his patents could not possibly have been effective.

With a view toward overcoming the deficiencies and objections to past attempts to motorize skis and provide a new and practical way of utilizing this concept, this invention has as its more specific object the provision of a ski-supported vehicle, in the nature of a motor bike in that the rider, when seated thereon, straddles the same and steers it by means of handlebars, and when power is needed, simply moves a lever to activate a pair of balloon-tired wheels at the rear of the vehicle.

With these observations and objectives in mind, the manner in which the invention achieves its purpose will be appreciated from the following description and the accompanying drawings, which exemplify the invention.

The accompanying drawings illustrate one complete example of the embodiment of the invention constructed according to the best mode so far devised for the practical application of the principles thereof and in which:

FIG. 1 is a perspective view of the vehicle of this invention illustrating its primary use;

FIG. 2 is a side elevational view of the vehicle, showing the same supported on its skis and with the foreground traction wheel removed to better illustrate the structure between the wheels;

FIG. 3 is a view similar to FIG. 2, but showing the rear ski elevated and the illustrated traction wheel operative;

FIG. 5 is a side view of the vehicle, at a smaller scale, illustrating the vehicle converted to use as a riding-type golf cart;

FIG. 6 is a view similar to FIG. 5, but showing the vehicle used as a shopping aid;

FIG. 7 is a side view, similar to FIG. 2, illustrating the vehicle of this invention in a slightly modified form.

Figure 4:
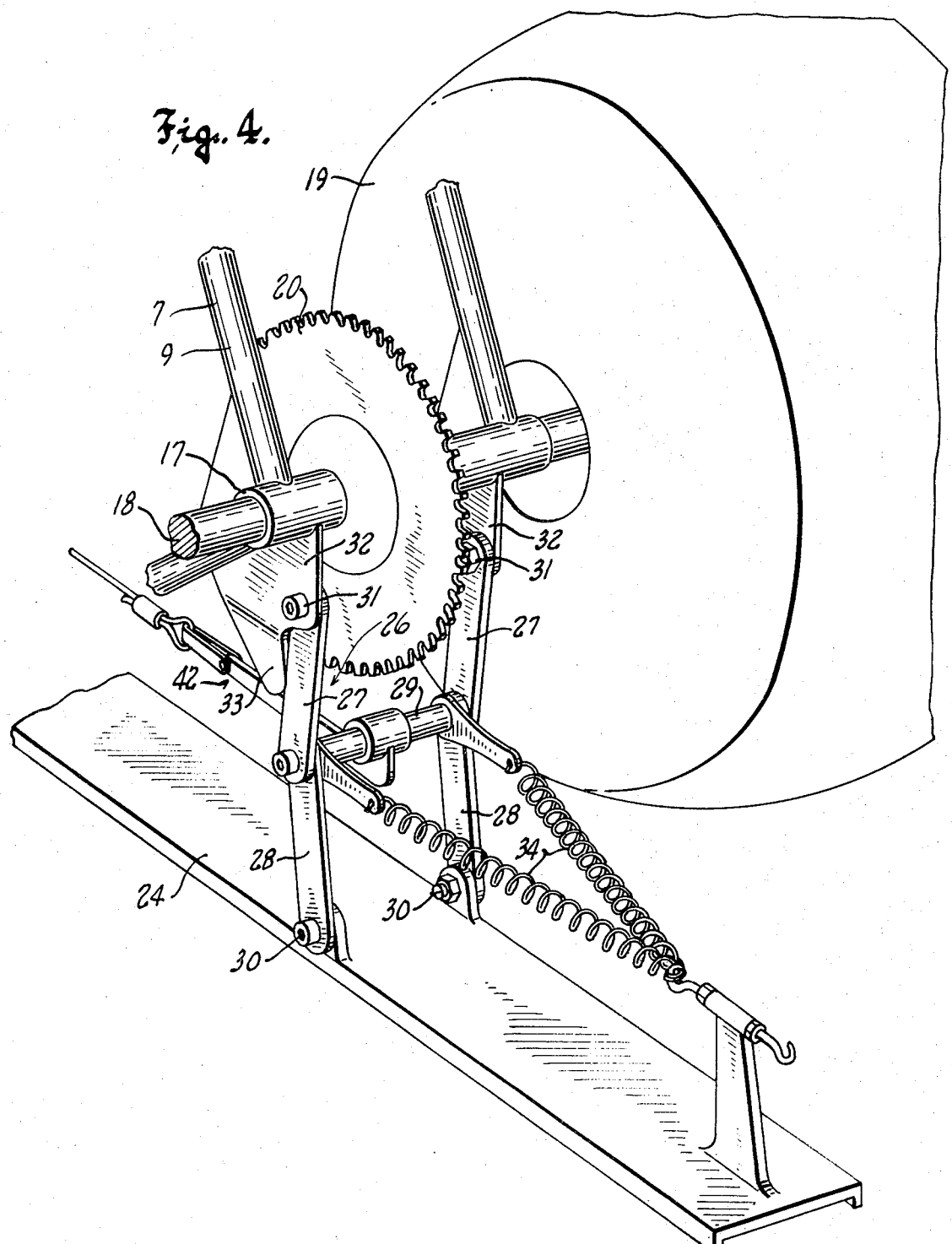
FIG. 4 is a perspective view of the structure between the traction wheels by which the traction wheels and the rear ski are connected with the frame of the vehicle and one or the other is selectively rendered operative.

Referring to the accompanying drawings, the numeral 7 designates the frame of the vehicle of this invention. This frame is conveniently made of metal tubing and includes a front end section 8, a forked rear end section 9 and upper and lower members 10 and 11 connecting the front and rear sections. The front end section pivotally mounts a front end supporting structure 12 for rotation about an upright axis. This supporting structure includes parallel side members 13 which straddle a wheel 14 and, by means of suitable bearings, rotatably mount the axle 15 of this wheel.

The upper ends of the side members 13 are directed laterally outward to provide handlebars 16 by which the vehicle is steered.

The forked rear end section 9 of the frame mounts bearings 17 in which the axle 18 of a pair of large balloon-tired tractions wheels 19 is journaled. The wheels are fixed to the end portions of the axle and, as clearly shown in FIG. 1, are spaced outwardly of the frame. FIGS. 2 and 3, for sake of clarity, have the foreground wheel removed.

A sprocket wheel 20 fixed to the medial portion of the wheel axle 18 is embraced by the forked rear end section of the frame and is drivingly connected with the drive shaft of an internal-combustion engine 21 through a suitable chain and sprocket drive transmission, indicated generally by the numeral 22. The engine is mounted on the lower member 11 of the frame, and the drive transmission is equipped with a conventional clutch that is controllable from the handlebars. A rider seated upon the seat 23 of the vehicle, as shown in FIG. 1, thus can readily control the transmission of power to the traction wheels, and can also, in the conventional manner, control the engine speed.

The vehicle is selectively supported at its rear either by the traction wheels 19 or by a ski 24. The ski 24 has its front end pivoted to the lower member 11 of the frame, as at 25, and has its rear end portion connected with the frame by a toggle joint 26. In its extended or straightened condition, the toggle joint 26 holds the ski 24 at a level below the bottom of the traction wheels, as shown in FIG. 2, but in the collapsed condition of the toggle joint, the ski 24 is held at an elevation above the bottom of the traction wheels, as shown in FIG. 3.

The toggle joint 26 comprises a pair of spaced-parallel upper links 27 and a pair of spaced-parallel lower links 28 pivotally connected at the knee of the toggle joint by a crossshaft 29. The lower links 28 are pivotally connected, as at 30, to the ski 24 and the upper links are connected, as at 31, to plates 32 secured to the adjacent portion of the frame. These plates have downward projections 33 which are bent inwardly sufficiently to lie in the path of the upper links 27 and be engaged thereby when the toggle joint is straightened by a forward pull applied at its knee. The point at which projections 33 limit further forward travel of the links 27 is slightly beyond the dead center position of the toggle joint.

A pair of strong tension springs 34 connected between the rear end of the ski 24 and the knee of the toggle joint at all times tend to collapse the same, so that when the forward pull on the jount—which is applied thereto by a hand lever 35—is released, the toggle joint is immediately collapsed and the ski lifted, to render the traction wheels operative. The lever 35 is pivoted at its lower end to the frame, as at 36, and its upper free end portion rides in a slot 37 in a plate 38 fixed to the upper member 10 of the frame in front of the seat.

A cable having one end thereof connected to the lever, as at 39, and trained about a guide roller 40, passes downwardly towards the lower pivoted end of the lever where it enters a tube 41 fixed to the frame to have its opposite end connected to the knee of the toggle joint through linkage 42. Pulling back on the hand lever 35 thus straightens the toggle joint and disposes it in its slightly overcenter condition, shown in FIG. 2, holding the ski 24 below the level of the traction wheels. The lever can be releasably held in its pulled-back location by engaging it in a notch 43 in one edge of the slot 37.

Since the vehicle is primarily intended for use in winter, a short front ski 45 is detachably secured to the front end supporting structure 12, to be steered by means of the handlebars. This ski is held in place with the wheel 14 resting thereon, by a pair of platelike arms 46 which are fixed to the ski and are attached to the wheel axle 15 with the wheel therebetween. For this purpose the arms 46 have rearwardly facing notches in which the axle is received and secured against displacement by latches 48.

In using the vehicle for what might be called a ski sled, the rider preferably attaches a pair of short skis 50 to his feet and then sets himself upon the seat, as shown in FIG. 1. With the engine running, he is now ready to ride—downhill with the rear ski lowered and uphill with the ski lifted and the large balloon-tired traction wheels providing propulsion.

Figure 8:
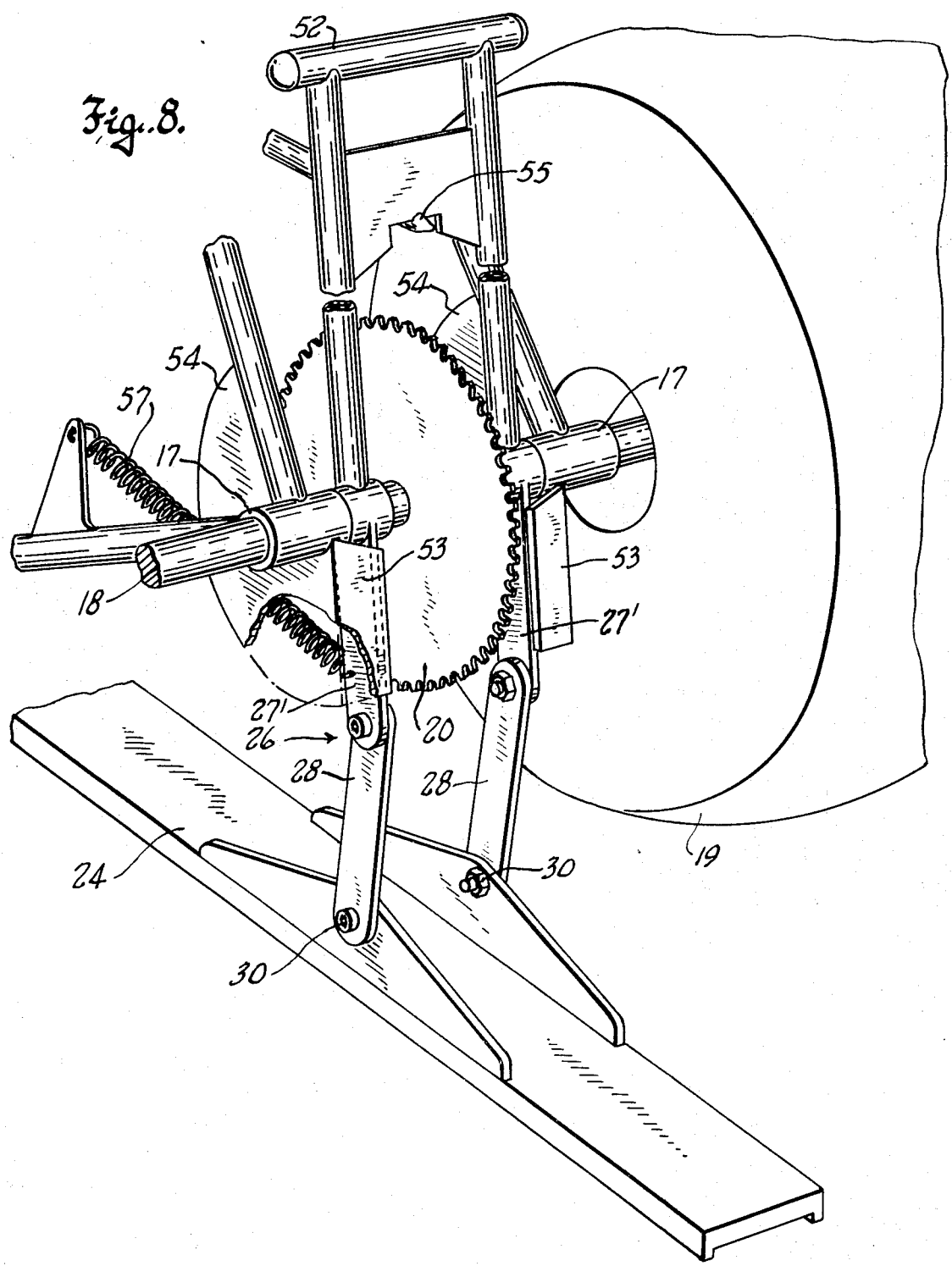
FIG. 8 is a perspective view of the ski mounting and adjusting structure of the vehicle shown in FIG. 7.

The modified embodiment of the invention illustrated in FIGS. 7 and 8 employs a simplified control for raising and lowering the rear ski. As in the structure previously described, the vehicle shown in FIGS. 7 and 8, also has balloon-tired traction wheels 19 and a rear ski 24 between the wheels and pivotally connected at its front end to the frame. A toggle joint 26 connects the ski with the axle shaft 18 upon which the wheels are mounted, to hold the ski in its elevated position when the toggle joint is collapsed, and in its lowered position when the toggle joint is extended. However, in this case, the knee of the toggle joint is rearward of dead center in the extended condition of the toggle and is moved to that position by a handle or control lever 52 located behind the seat. This handle or lever is pivoted on the axle shaft 18 and is rigidly connected with the upper links 27' of the toggle joint, so that by pulling the handle forward the toggle joint is extended. Collision of the upper links 27' with inwardly directed flanges 53 on arcuate plates 54 that are fixed to the frame, defines the extended condition of the toggle joint, and a readily releasable spring-pressed latch 55 under the seat holds the handle in its forward position. Release of the latch 55 and a slight rearward push on the handle enables a tension spring 57 connected between the knee of the toggle joint and the frame to collapse the toggle joint and raise the ski.

When the winter sports season is over, the vehicle can be readily converted to use as a riding golf cart, as shown in FIG. 5. All that is required to effect such conversion is the removal of the skis and, of course, the mechanism for raising and lowering the rear ski.

Those skilled in the art will appreciate that the invention can be embodied in forms other than as herein disclosed for purposes of illustration.

The invention is defined by the following claims:

1. A convertible snow motorcycle comprising:
   A. a frame having a front end and a rear end;
   B. a seat on the frame upon which the rider sits straddling the frame;
   C. front end supporting and steering means including a front ski and handlebars;
   D. pivot means connecting the front end supporting and steering means with the front end of the frame for rotation about an upright axis,
      so that said front ski may be turned by manipulation of the handlebars to steer travel of the motorcycle over the terraine;
   E. rear end supporting means comprising power-driven traction wheel means and rear ski means;
   F. means supportingly connecting the frame with the said traction wheel means and with said rear ski means;
      the connection between the traction wheel means and the frame constraining the wheel means to rotation about an axis fixed with respect to the frame, and the connection between the rear ski means and the frame comprising pivot means connecting the front end of the rear ski means with the frame forwardly of the wheel means, and a toggle joint connecting the rear end portion of the rear ski means with the frame, said toggle joint when collapsed holding the rear ski means above the bottom of the wheel means, and when straightened out holding the rear ski means at a level below the bottom of the wheel means; and
   G. manually controllable selecting means operable to straighten out the toggle joint.

2. The convertible snow motorcycle of claim 1, further characterized by biasing means acting upon the toggle joint to yieldingly hold the toggle joint in its collapsed condition.

3. The convertible snow motorcycle of claim 2, wherein said biasing means comprises a tension spring connected between the knee of the toggle joint and the rear end of the rear ski means.

4. The convertible snow motorcycle of claim 2, wherein said manually controllable selection means comprises an upright hand lever pivoted at its lower end to the frame at a point in front of the seat for to-and-fro swinging movement toward and from the seat, and
   cable means connecting said hand lever with the knee of the toggle joint.

5. The convertible snow motorcycle of claim 1, wherein said traction wheel means comprises a pair of large balloon-tired wheels, one at each side of the frame, and
   wherein said rear ski means comprises a single ski between said wheels, so that when the rear ski means is operative to support the rear end of the frame the vehicle is supported on two skis, one behind the other, and when the traction wheel means is operative, the vehicle has a three-point support consisting of the front-steerable ski and the balloon-tired wheels.

6. A riding-type vehicle comprising:
   A. a frame having a front end and a rear end;
   B. a seat on the frame upon which the rider sits straddling the frame;
   C. front end supporting and steering means including a front ski;
   D. a transverse axle shaft at the rear end portion of the frame;
   E. a pair of power-driven balloon-tired wheels mounted on the end portions of said axle shaft;
   F. a rear ski between the wheels projecting forwardly and rearwardly thereof;
   G. pivot means connecting the front end of said rear ski with the frame;
   H. a toggle joint connecting the axle shaft with the rear ski, said toggle joint in its extended position holding the ski in a lowered position below the level of the bottom of the wheels, and in its collapsed condition holding the ski above the level of the bottom of the wheels;
   I. stop means on the frame with which a part of the toggle joint collides to define the extended condition of the toggle joint;
   J. biasing means reacting between the toggle joint and the frame yieldingly urging the toggle joint toward its collapsed condition; and
   K. manually operable control means connected with the toggle joint for moving the same to its extended condition.

7. The riding-type vehicle of claim 6, wherein said manually operable control means comprises
   a hand lever pivoted to the frame in front of the seat,
   and a cable connecting the lever with the knee of the toggle joint.

8. The riding-type vehicle of claim 6, wherein the toggle joint has upper and lower links, the upper link being pivotally connected to the axle shaft, and
   wherein said manually operable control means comprises a control lever pivoted to the axle shaft and fixed with respect to the upper link of the toggle joint,
   said control lever being located behind the seat.

* * * * *